United States Patent [19]

Habermeier

[11] 4,034,018

[45] * July 5, 1977

[54] LINEAR POLYESTERS BASED ON S-TRIAZINEDICARBOXYLIC ACIDS

[75] Inventor: Jurgen Habermeier, Pfeffingen, Switzerland

[73] Assignee: Ciba-Geigy Corporation, Ardsley, N.Y.

[ * ] Notice: The portion of the term of this patent subsequent to July 5, 1994, has been disclaimed.

[22] Filed: July 21, 1975

[21] Appl. No.: 597,609

[30] Foreign Application Priority Data

July 30, 1974 Switzerland .................... 10477/74

[52] U.S. Cl. .............................. 260/860; 260/75 N
[51] Int. Cl.² .................. C08L 67/02; C08G 63/68
[58] Field of Search ......................... 260/75 N, 860

[56] References Cited

UNITED STATES PATENTS

| | | |
|---|---|---|
| 3,856,754 | 12/1974 | Habermeier et al. ............ 260/75 N |
| 3,860,564 | 1/1975 | Habermeier et al. ............ 260/75 N |

FOREIGN PATENTS OR APPLICATIONS 2,121,184  11/1974  Germany

*Primary Examiner*—Howard E. Schain
*Assistant Examiner*—W. C. Danison, Jr.
*Attorney, Agent, or Firm*—Luther A. R. Hall

[57] ABSTRACT

Linear, thermoplastic polyesters formed from certain s-triazinedicarboxylic acids, N-heterocyclic diols, and, if appropriate, alkanediols. The polyesters are thermoplastic materials from which moulded materials having valuable thermo-mechanical properties can be manufactured by the customary shaping processes, such as casting, injection moulding and extrusion. They are suitable for use as engineering plastic materials and for coating objects.

8 Claims, No Drawings

LINEAR POLYESTERS BASED ON S-TRIAZINEDICARBOXYLIC ACIDS

The present invention relates to linear, thermoplastic polyesters formed from certain s-triazinedicarboxylic acids, N-heterocyclic diols and, if appropriate, alkanediols, a process for the manufacture of the new polyesters and the use of these polyesters, which are valuable thermoplastic materials.

It has already been proposed, in German Offenlegungsschrift (DT-OS) 2,121,184, to use s-triazinedicarboxylic acid or esters thereof for the manufacture of polymers, such as polyesters, polyamides, polybenzimidazoles or polybenzoxazoles. Compared with the thermoplastic polyalkylene terephthalates, the polyesters which are manufactured, for example, from s-triazinedicarboxylic acids and alkanediols, have higher glass transition points, but they have the disadvantage that they are more difficult to process, because relatively high temperatures are required to process them.

It has now been found that polyesters, based on s-triazinedicarboxylic acids, having even higher glass transition points and a more favourable relationship between glass transition point and processability are obtained if the s-triazinedicarboxylic acids are polycondensed with certain N-heterocyclic diols and, if appropriate, with alkanediols. Furthermore, the polyesters which are synthesized solely from the s-triazinedicarboxylic acids and the N-heterocyclic diols, are also distinguished by better properties. The polyesters according to the invention thus have better thermomechanical properties and can be processed more advantageously.

The present invention therefore relates to linear, thermoplastic polyesters having a relative viscosity of 1.1 to 3.0, measured at 30° C on a 1% strength solution consisting of equal parts of phenol and tetrachloroethane, which are characterized by the structural elements of the general formula I

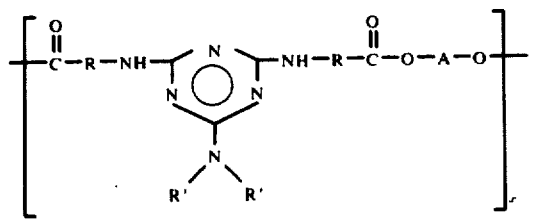

(I)

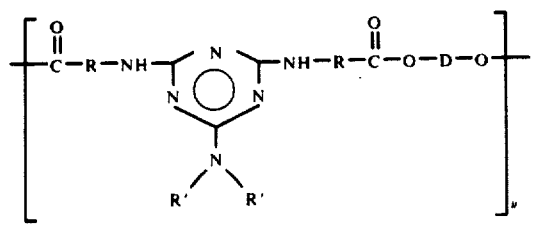

wherein R denotes an aliphatic radical having 1 to 6 C atoms or the para-phenylene radical, R' represents methyl, ethyl, phenyl or cyclohexyl, A denotes the radical of the formula

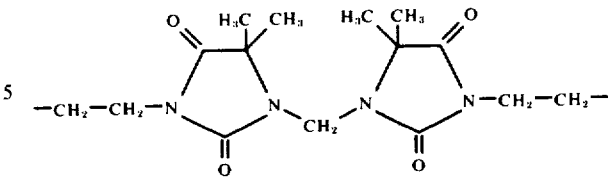

and/or a radical of the formula

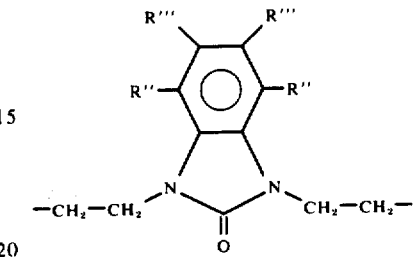

and/or a radical of the formula

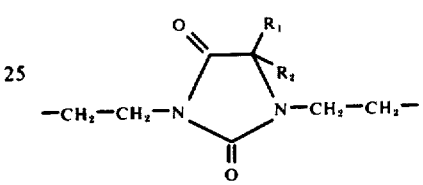

wherein R" and R''' represent H atoms, chlorine atoms or bromine atoms, or R" represents a H atom and R''' represents a chlorine or bromine atom, and $R_1$ and $R_2$ represent methyl or ethyl, or conjointly represent pentamethylene, D denotes an aliphatic radical having 2 to 10 C atoms, and the mol fraction $(x/x+y)$ formed from $x$ and $y$ has values of 0.1 to 1, preferably 0.4 to 0.9, and $x$ and $y$ each denote a number from 1 to 30, and $y$ can also be 0.

Preferably, the polyesters having the structural elements of the formula I have a relative viscosity of 1.3 to 2.5 and, in the formula I, R denotes the para-phenylene radical, R' denotes ethyl or phenyl, A denotes the radical of the formula

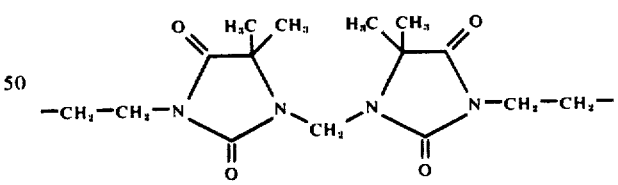

or a radical of the formula

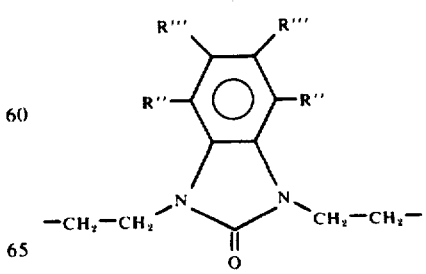

or a radical of the formula

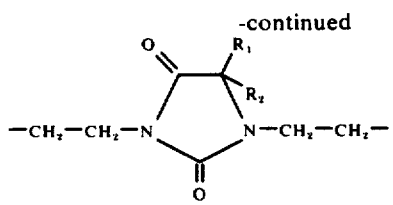

wherein R'' and R''' represent H atoms, chlorine atoms or bromine atoms, and $R_1$ and $R_2$ each represent the methyl group, D denotes an aliphatic radical having 2 to 4 C atoms, and the mol fraction $(x/x + y)$ formed from $x$ and $y$ has values of 0.4 to 0.9, $x$ and $y$ each denoting a number from 1 to 30.

The new polyesters having the structural elements of the formula I are obtained by known processes, by polycondensing, in a molar ratio corresponding to the mol fraction $(x/x + y) = 0.1$ to 1.0, preferably 0.4 to 0.9, and in the presence of catalysts, in a known manner, to a relative viscosity of 1.1 to 3.0, measured at 30° C on a 1% strength solution consisting of equal parts of phenol and tetrachloroethane, $x + y$ mols of s-triazinedicarboxylic acids, or polyester-forming derivatives thereof, of the formula II

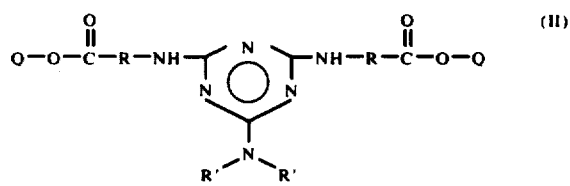

wherein Q represents a hydrogen atom, an alkyl group having 1 to 6 C atoms or the phenyl group, and R, R', $x$ and $y$ have the same meaning as in formula I, with $x$ mols of diols of the formula III

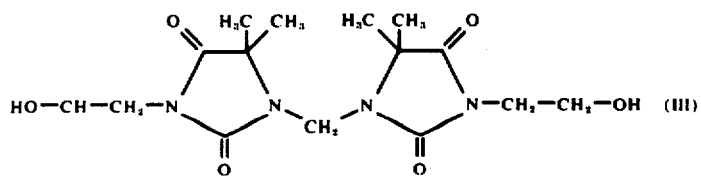

and/or of the formula IV

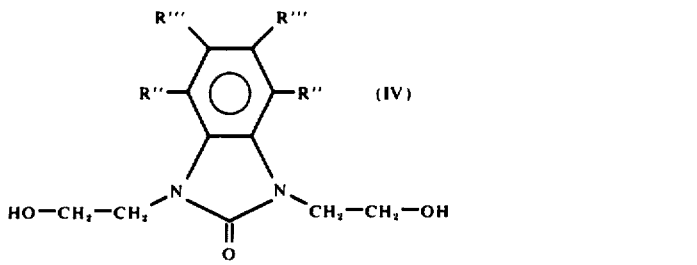

and/or of the formula V

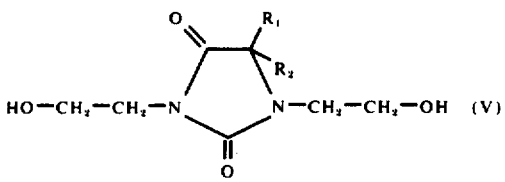

and $y$ mols of a diol of the formula VI

HO—D—OH  (VI)

Preferably, $x + y$ mols of s-triazinedicarboxylic acid diesters of the formula II wherein $R_1$ denotes a lower alkyl group having 1 to 4 C atoms or the phenyl group, R denotes the para-phenylene radical and R' represents ethyl or phenyl, and $x$ and $y$ denote integers, are polycondensed, in a molar ratio corresponding to the mol fraction $(x/x + y) = 0.4$ to 0.9, to a relative viscosity of 1.3 to 2.5, with $x$ mols of the diol of the formula III or of a diol of the formula IV or V and $y$ mols of an aliphatic diol of the formula VI wherein D denotes an aliphatic radical having 2 to 4 C atoms.

The low molecular dialkyl esters having 1 to 4 carbon atoms in the molecule, preferably dimethyl and diethyl esters, or diphenyl esters, are mainly used as the polyester-forming derivatives of the s-triazinedicarboxylic acids of the formula II. Furthermore, the acid dihalides, particularly the acid dichlorides, are also suitable.

The s-triazine compounds of the formula II are known compounds, the manufacturing processes for which are described in DT-OS 2,121,184. The general process consists in reacting cyanuric acid chloride or an amino-substituted dichloro-s-triazine with aminoacids or aminoacid esters in the presence of a base and water.

1,1'-Methylene-bis-[3-(2-hydroxyethyl)-5,5-dimethylhydantoin] of the formula III is a known compound and can be manufactured by the process described in U.S. Pat. No. 3,679,681, by adding on 2 mols of ethylene oxide to 1,1'-methylene-bis-(5,5-dimethylhydantoin).

Compounds which correspond to the formula IV are 1,3-di-(2-hydroxyethyl)-benzimidazolone, 1,3-di-(2hydroxyethyl)-4,5,6,7-tetrachlorobenzimidazolone, 1,3-di-(2-hydroxyethyl)-4,5,6,7-tetrabromobenzimidazolone, 1,3-di-(2-hydroxyethyl)-5,6-dichlorobenzimidazolone and 1,3-di-(2-hydroxyethyl)-5,6-dibromobenzimidazolone.

1,3-Di-(2-hydroxyethyl)-benzimidazolone is known from the literature. It can, for example, be obtained by the process described in DT-OS 2,342,432, by adding on two mols of ethylene oxide to 1 mol of benzimidazolone. The halogeno-substituted benzimidazolone compounds can be manufactured by chlorinating or brominating 1,3-di-(hydroxyethyl)-benzimidazolone in a known manner.

The compounds of the formula V are known from British Pat. No. 1,290,729 (for example Example 12).

The new polyesters can also be manufactured by using mixtures of N-heterocyclic diols of the formula IV and mixtures which contain the N-heterocyclic diol of the formula III, and any desired mixing ratio can be selected, that is to say it is not critical.

The formula V represents the known linear, optionally alkyl-substituted, aliphatic diols which have 2 to 10 C atoms.

The known processes for the manufacture of the new polyesters are, for example, solution condensation or azeotropic condensation, interface condensation, melt condensation or solid phase condensation, as well as a combination of these methods, depending on which polyester-forming derivatives and catalysts for the reaction are used.

The new polyesters can be manufactured by esterifying or trans-esterifying s-triazinedicarboxylic acids, or low-molecular dialkyl esters thereof, with the diols of the formulae III and/or IV and/or V, preferably mixed with the diols of the formula VI, in an inert atmosphere, for example a nitrogen atmosphere, in the presence of catalysts and with simultaneous removal of, respectively, the water or alkanol formed, at 150°–250° C, and subsequently carrying out the polycondensation at 220°–330° C and under reduced pressure, in the presence of certain catalysts, until the polycondensates have the desired viscosity.

When manufacturing polyesters which, besides the diols which are to be used in accordance with the invention, also contain compounds of the formula VI as the aliphatic diol component, it is advantageous to use this diol component in an excess, so that, after the esterification or transesterification reaction, essentially monomeric diglycol esters derived from the diols of the formulae III, IV, V and VI are obtained, which are then polycondensed in the presence of a polycondensation catalyst and while distilling off the excess aliphatic diol of the formula VI in vacuo.

Amines, inorganic or organic acids, for example hydrochloric acid or p-toluenesulphonic acid, or metal compounds, which are also suitable for use as trans-esterification catalysts, can be used in a known manner as the esterification catalysts.

Since some catalysts preferentially accelerate the trans-esterification and others the polycondensation, it is advantageous to use a combination of several catalysts. Examples of suitable trans-esterification catalysts are the oxides, salts or organic compounds of the metals calcium, magnesium, zinc, cadmium, manganese, titanium and cobalt. It is also possible to use the metals as such, as catalysts. The polycondensation is catalysed, for example, by metals such as lead, titanium, germanium and, in particular, antimony, and compounds thereof. These catalysts can be added to the reaction mixture together or separately. These catalysts are employed in quantities of about 0.001 to 1.0 percent by weight, relative to the acid component.

When manufacturing the new polyesters it is particularly advantageous to use those catalysts which accelerate both the trans-esterification and the polycondensation. Catalysts of this kind which can be used are, above all, mixtures of various metals or metal compounds as well as corresponding metal alloys.

The polycondensation reaction is carried out until the polyesters have a relative viscosity of 1.1 to 3.0, preferably 1.3 to 2.5. Depending on the nature of the catalyst used and the size of the batch, the reaction times are about 30 minutes to several hours. The resulting polyester melt is removed from the reaction vessel, cooled and then granulated or cut into chips in the customary manner.

Another process for the manufacture of the new polyesters consists in polycondensing s-triazinedicarboxylic acid dihalides of the formula II, preferably the acid dichlorides, with the diols of the formula III and/or IV, if appropriate mixed with the diols of the formula V, in the presence of a basic catalyst, in the temperature range from 0° to 180° C, while eliminating hydrogen halide. Tertiary amines or quaternary ammonium salts are preferably used as the basic catalysts. The proportion of the basic catalyst can be from 0.1 to 100 mol%, relative to the acid halides. This process can also be carried out without a solvent or in the presence of a solvent.

The polycondensation can also be carried out by first condensing the starting compounds, in the melt, until a certain viscosity is reached, then granulating, for example with the aid of an underwater granulator, the precondensate thus produced, drying the granules and then subjecting them to a solid phase condensation in which a vacuum and temperatures below the melting point of the granules are used. Higher viscosities of the polyesters can be achieved in this way.

When working up the polyester melt, or even before the polycondensation reaction, inert additives of all kinds, such as, for example, fillers, reinforcing materials, particularly glass fibres, inorganic or organic pigments, optical brighteners, delustring agents, agents for promoting crystallisation and additives which impart non-inflammable or flame-retarding properties, such as, for example, antimony trioxide and organic compounds which have a high content of chlorine and bromine, can be added to the reaction mass.

If the polycondensation reaction is carried out discontinuously, these known measures can be taken already during the last stages of the condensation, for example in the solid phase condensation or at the end of the melt condensation.

The polyesters according to the invention can be partly crystalline or amorphous, depending on which dicarboxylic acids and which diols are used as the starting components and the ratios in which these are employed.

Depending on the reaction conditions and the ratio of the starting substances employed, block polyesters are formed, that is to say compounds of the formula I in which $x$ and $y$ are 2 or more.

The new polyesters are colourless to brown-coloured and are thermoplastic materials from which moulded materials having valuable thermo-mechanical properties can be manufactured by the customary shaping processes, such as casting, injection moulding and extrusion. The new polyesters can be processed readily on conventional injection moulding machines.

The new polyesters are particularly suitable for use as "engineering plastic" materials which are suitable for the manufacture of shaped articles, such as gear wheels, containers for chemicals or food, machine parts and parts of apparatuses, sheets, plates, films, fusion adhesives and coatings, and also for the manufacture of semi-finished products which can be shaped by machining. The polyesters can also be used for coating objects, for example by the known powder coating processes.

The polyesters prepared in the examples which follow are characterised more exactly by the following characteristic values: the polyesters are characterised by those morphological changes which are measured by means of differential thermo-analysis on a sample which is heat-treated for 3 minutes at 30° C above the melting point or softening point and is then rapidly chilled. The chilled sample is heated at a heating-up rate of 16° C/minute by means of a DSC-2B differential scanning calorimeter of Messrs. Perkin-Elmer. The glass transition temperature is indicated in the thermogram as the point of inflection at the sudden increase in the specific heat, the glass transition range is indicated as the range in which the specific heat increases suddenly from one level to a higher level, the crystallisation temperature is indicated as the apex of the exothermic peak and the melting point is indicated as the apex of the endothermic peak. The relative viscosity of the polycondensates of the examples is determined at 30° C on solutions of 1 g of polyester in 100 ml of a mixture consisting of equal parts of phenol and tetrachloroethane. The softening point is determined by the Kofler method on a microscope with a heated stage at a heating-up rate of 15° C/minute, a cross being formed from 2 filaments and the softening point being taken as the temperature at which the sharp angles of the cross disappear. The nitrogen content is determined by elementary analysis.

PREPARATION EXAMPLES

EXAMPLE 1

A mixture of: 23.0 g (0.04 mol) of 2-diphenylamino-4,6-bis-(p-ethoxycarbonylanilino)-s-triazine, 12.8 g (0.036 mol) of 1,1'-methylene-bis-3-(2-hydroxyethyl)-5,5-dimethylhydantoin, 3.6 g (0.04 mol) of butane-1,4-diol and 0.025 g of tetraisopropyl ortho-titanate, in a polycondensation apparatus made of glass and fitted with a stirrer, a descending condenser fitted with a receiver, a thermometer and a $N_2$ capillary, is stirred in accordance with the following time/temperature/vacuum programme:

5 hours / 175° → 265° C / nitrogen, normal pressure (760 mm Hg) 2 hours / 265° → 295° C / nitrogen / 760 mm Hg → 14 mm Hg 1 hour / 295° → 320° C / $N_2$ / 14 mm Hg → 0.15 mm Hg Nitrogen is then admitted to the polycondensate and the copolyester is poured out onto a metal sheet to cool.

The pale yellow, glass-clear product has the following properties:
relative viscosity — 1.49
softening point (Kofler method) — approx. 250° C
glass transition range (DSC) — 196°–210° C
decomposition temperature (DSC) — 372° C

EXAMPLE 2

The components which follow are mixed in an apparatus according to Example 1 and are submitted to a polycondensation reaction in accordance with the time/temperature/vacuum programme indicated in Example 1: 23.0 g (0.04 mol) of 2-diphenylamino-4,6-bis-(p-ethoxycarbonylanilino)-s-triazine, 12.96 g (0.036 mol) of 1,3-di-(2-hydroxyethyl)-4,5,6,7-tetrachlorobenzimidazolone, 3.6 g (0.04 mol) of 1,4-butanediol and 0.025 g of tetraisopropyl ortho-titanate.

This gives a light brown, amorphous polymer which has the following properties:
relative viscosity — 1.29
softening point (Kofler method) — 260° C
glass transition range (DSC) — 202°–218° C
decomposition temperature (DSC) — 349° C

EXAMPLE 3

Copolyester having 90 mol% of 1,1'-methylene-bis-[3-(2'-hydroxyethyl)-5,5-dimethylhydantoin] and 10 mol% of butanediol.

The mixture which follows is trans-esterified and subjected to polycondensation in accordance with Example 1: 23.9 g (0.05 mol) of 2-diethylamino-4,6-bis-(p-ethoxycarbonylanilino)-s-triazine, 16 g (0.045 mol) of 1,1'-methylenebis-[3-(2'-hydroxyethyl)-5,5-dimethylhydantoin], 20.5 g (0.2725 mol) of 1,4-butanediol and 0.7 ml of 0.02 M tetraisopropyl ortho-titanate in n-butanol. This gives a copolyester having the following properties:
relative viscosity — 1.22
softening point (Kofler method) — 202° C
glass transition range (DSC) — 150°–159° C
decomposition temperature (DSC) — 350° C

EXAMPLE 4

Copolyester having 10 mol% of 1,1'-methylene-bis-[3-(2-hydroxyethyl)-5,5-dimethylhydantoin] and 90 mol% of butanediol.

This mixture which follows is trans-esterified and subsequently subjected to polycondensation in accordance with Example 1: 38.3 g (0.08 mol) of 2-diethylamino-4,6-bis-(p-ethoxycarbonylanilino)-s-triazine, 2.9 g (0.008 mol) of 1,1'-methylene-bis-[3-(2'-hydroxyethyl)-5,5-dimethylhydantoin], 39.6 g (0.5 mol) of 1,4-butanediol and 0.6 ml of 0.02 M tetraisopropyl ortho-titanate in n-butanol.

The resulting copolyester has the following properties:
relative viscosity — 1.30
softening point (Kofler method) — 200° C
glass transition range (DSC) — 140°–149° C
decomposition temperature (DSC) — 335° C

EXAMPLE 5

Copolyester formed from 2-diphenylamino-4,6-bis-(p-ethoxycarbonylanilino)-s-triazine, 40 mol% of 1,3-di-(2'-hydroxyethyl)-benzimidazolone and 60 mol% of ethylene glycol.

Using a mixture of 0.01 g of zinc acetate, 0.01 g of calcium acetate and 0.01 g of antimony trioxide as the catalyst, a mixture of 28.73 g (0.05 mol) of 2-diphenylamino-4,6-bis-(p-ethoxycarbonylanilino)-s-triazine, 4.4 g (0.02 mol) of 1,3-di-(2-hydroxyethyl)-benzimidazolone and 15.5 g (0.25 mol) of ethylene glycol is trans-esterified and subjected to polycondensation as follows:

2 hours / 160° C → 200° C / N₂ / normal pressure / stirring 2 hours / 200° C → 240° C / N₂ / normal pressure / stirring 1 hour / 240° C → 272° C / N₂ / 760 mm Hg → 25 mm Hg / stirring 0.5 hour / 272° C → 290° C / N₂ / 25 mm Hg → 0.1 mm Hg / stirring.

The copolyester obtained in this way has the following properties:
appearance: — light yellow, of a clear transparency, amorphous
softening point (Kofler method — 205° C
relative viscosity — 1.24
glass transition range (DSC) — 196°–206° C
decomposition temperature (DSC) — 345° C

EXAMPLE 6

Copolyester formed from 2-diphenylamino-4,6-bis-p-ethoxycarbonylanilino)-s-triazine, 90 mol% of 1,3-di-(2-hydroxyethyl)-4,5,6,7-tetrabromobenzimidazolone and 10 mol% of butanediol.

A mixture of 28.73 g (0.05 mol) of 2-diphenylamino-4,6-bis-(p-ethoxycarbonylanilino)-s-triazine, 24.2 g (0.045 mol) of 1,3-di-(2-hydroxyethyl)-4,5,6,7-tetrabromobenzimidazolone and 22.6 g of butane-1,4-diol is trans-esterified and subjected to polycondensation in accordance with the reaction conditions described in Example 5, using 0.15 g of tetraisopropyl ortho-titanate as the catalyst. This gives a slightly discoloured copolyester of clear transparency, which softens at 215° C and has a relative viscosity of 1.21. The glass transition range, determined by DSC analysis, is 195°–205° C. Owing to its bromine content of 31.2% by weight of bromine, this copolyester is not combustible.

EXAMPLE 7

Copolyester formed from 2-diphenylamino-4,6-bis-(5'-carboxy-n-pentylamino)-s-triazine, 20 mol% of 1,1'-methylene-bis-[3-(2'-hydroxyethyl)-5,5-dimethylhydantoin] and 80 mol% of ethylene glycol.

The mixture of monomers which follows is transesterified and subjected to polycondensation in accordance with the reaction conditions mentioned in Example 5, using a mixture of 0.05 g of zinc acetate, 0.05 g of calcium acetate and 0.15 g of antimony trioxide as the catalyst: 50.7 g (0.1 mol) of 2-diphenylamino-4,6-bis-(5'-carboxy-n-pentylamino)-s-triazine, 7.12 g (0.02 mol) of 1,1'-methylene-bis-[3-(2'-hydroxyethyl)-5,5-dimethylhydantoin] and 15.5 g (0.25 mol) of ethylene glycol. This gives a very tough copolyester which softens at 75° C. Its relative viscosity is 1.41, its glass transition temperature (DSC) is determined as 53°–65° C and thermal decomposition begins from 322° C (DSC).

EXAMPLE 8

Homopolyester formed from 1,3-di-(2-hydroxyethyl)benzimidazolone and 2-diphenylamino-4,6-bis-(p-ethoxycarbonylanilino)-s-triazine.

A mixture of 11.1 g (0.05 mol) of 1,3-di-(2-hydroxyethyl)-benzimidazolone benzimidazolone and 28.73 g (0.05 mol) of 2-diphenylamino-4,6-bis-(p-ethoxycarbonylanilino)-s-triazine is subjected to polycondensation in accordance with the reaction conditions indicated in Example 5, using 0.1 g of tetraisopropyl orthotitanate as the catalyst. The resin obtained in this way has the following properties:
appearance — light brown, of clear transparency and tough
softening point (Kofler method) — 226° C
relative viscosity — 1.34
glass transition range (DSC) — 196°–206° C
decomposition temperature (DSC) — 362° C.

EXAMPLE 9

Copolyester formed from 2-dicyclohexylamino-4,6-bis-(p-ethoxycarbonylanilino)-s-triazine, 90 mol% of 1,10-decanediol and 10 mol% of 1,1'-methylene-bis-[3-(2'-hydroxyethyl)-5,5-dimethylhydantoin].

A mixture of 29.34 g (0.05 mol) of 2-dicyclohexylamino-4,6-bis-(p-ethoxycarbonylanilino)-s-triazine, 7.85 g (0.045 mol) of 1,10-decanediol, 1.78 g (0.005 mol) of 1,1'-methylene-bis-[3-(2'-hydroxyethyl)-5,5-dimethylhydantoin] and 1.24 g of ethylene glycol (as an auxiliary agent for the reaction, which is removed again by distillation during the polycondensation) is trans-esterified and subjected to polycondensation in exact accordance with the conditions of Example 7, using a catalyst mixture composed of 0.01 g of zinc acetate, 0.01 g of calcium acetate and 0.03 g of antimony trioxide. This gives a colourless, clear copolyester which softens at 182° C and which has a relative viscosity of 1.37 and a glass transition range of 129°–143° C.

EXAMPLE 10

Homopolyester formed from 1,3-di-(2'-hydroxyethyl)-5,5-dimethylhydantoin and 2-diphenylamino-4,6-bis-(p-ethoxycarbonylanilino)-s-triazine.

Using a mixture of 0.07 g of calcium acetate, 0.07 g of manganese-(II) acetate and 0.14 g of antimony trioxide, a mixture of 81.2 g (0.15 mol) of 2-diphenylamino-4,6-bis-(p-ethoxycarbonylanilino)-s-triazine and 30.0 g of 1,3-di-(2'-hydroxyethyl)-5,5-dimethylhydantoin is subjected to polycondensation under a N₂ atmosphere in accordance with the following programme:

1 hour / room temperature to 240° C — 760 mm Hg
1 hour / 240°–270° C — 760 mm Hg
30 minutes / 270°–280° C — 15 mm Hg
30 minutes / 280°–300° C — 0.4 mm Hg The polyester obtained in this way is only slightly discoloured. It has a relative viscosity of 1.26 and softens at 228° C.

What we claim is:

1. A linear, thermoplastic polyester having a relative viscosity of 1.1 to 3.0, measured at 30° C. on a 1% strength solution consisting of equal parts of phenol and tetrachloroethane, characterised by the structural elements of the general formula I

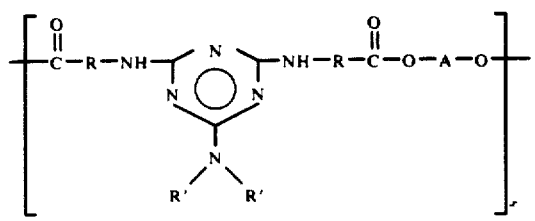

(I)

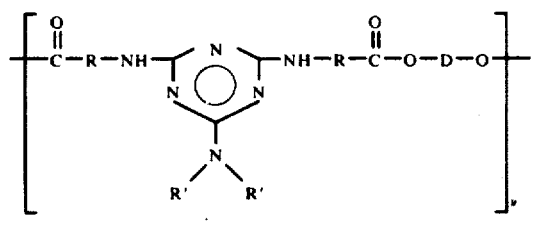

wherein R denotes an aliphatic radical having 1 to 6 C atoms or the para-phenylene radical, R' represents

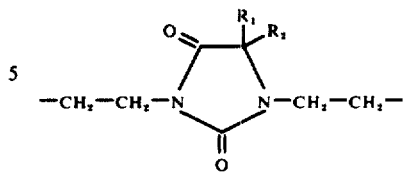

wherein R'' and R''' represent H atoms, chlorine atoms or bromine atoms, or R'' represents a H atom and R''' represents a chlorine or bromine atom, and $R_1$ and $R_2$ represents methyl or ethyl, or conjointly represent pentamethylene, D denotes an aliphatic radical having 2 to 10 C atoms, and the mol fraction $(x/x + y)$ formed from $x$ and $y$ has values of 0.1 to 1, and $x$ and $y$ each denote a number from 1 to 30, and $y$ can also be 0.

2. A polyester according to claim 1 having a relative viscosity of 1.3 to 2.5, characterised in that, in the formula I, R denotes the para-phenylene radical, R' denotes ethyl or phenyl, A denotes the radical of the formula

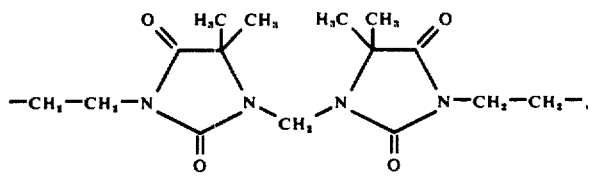

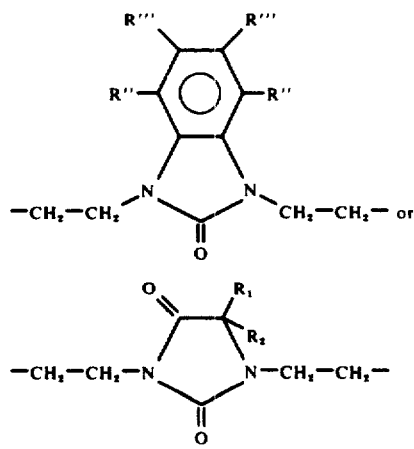

methyl, ethyl, phenyl or cyclohexyl, A denotes a diradical selected from the group consisting of

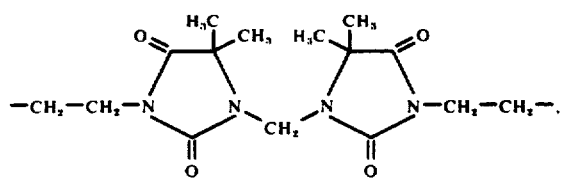

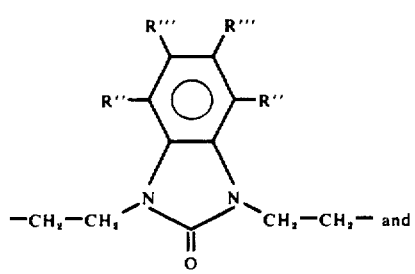

wherein R'' and R''' represent H atoms, chlorine atoms or bromine atoms, and $R_1$ and $R_2$ each represent the methyl group, D denotes an aliphatic radical having 2 to 4 C atoms, and the mol fraction $(x/x + y)$ formed from $x$ and $y$ has values of 0.4 to 0.9, $x$ and $y$ each denoting a number from 1 to 30.

3. A polyester according to claim 1, characterised in that, in the formula I, R represents the para-phenylene radical, R' represents the phenyl or ethyl group, A represents the 1,1'-methylene-bis-[3-ethylene-5,5-dimethylhydantoin] radical and D represents the butylene radical.

4. A polyester according to claim 1, characterised in that, in the formula I, R represents the para-phenylene radical, R' represents the phenyl group, A represents the 1,3-diethylene-4,5,6,7-tetrachlorobenzimidazolone radical and D represents the butylene radical.

5. Process for the manufacture of a linear, thermoplastic polyester having the structural elements of the formula I

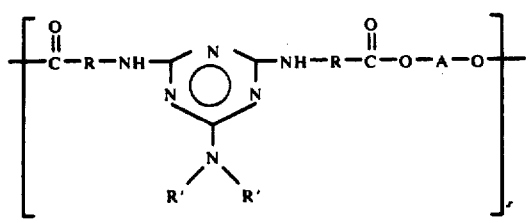

(I)

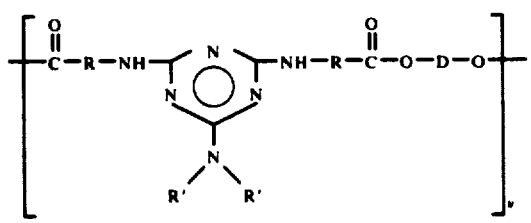

wherein R denotes an aliphatic radical having 1 to 6 C atoms or the para-phenylene radical, R' represents methyl, ethyl, phenyl or cyclohexyl, A denotes a diradical selected from the group consisting of

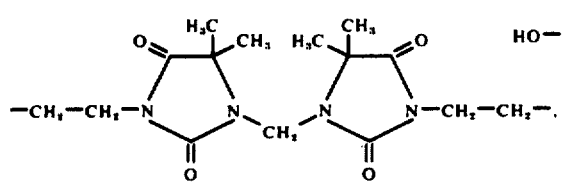

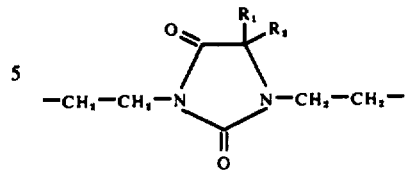

wherein R'' and R''' represent H atoms, chlorine atoms or bromine atoms, or R'' represents a H atom and R''' represents a chlorine or bromine atom, and $R_1$ and $R_2$ represent methyl or ethyl, or conjointly represent pentamethylene, D denotes an aliphatic radical having 2 to 10 C atoms, $x$ and $y$ each represent a number from 1 to 30 and $y$ can also be 0, characterized in that $x + y$ mols of s-triazinedicarboxylic acids or polyester-forming derivatives thereof, of the formula II

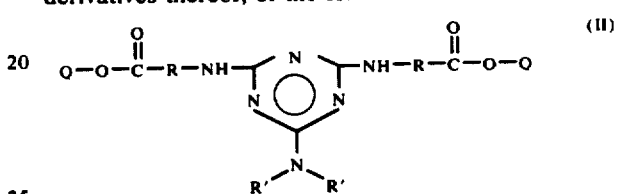

(II)

wherein Q represents a hydrogen atom, an alkyl group having 1 to 6 C atoms or the phenyl group, are polycondensed with $x$ mols of a diol selected from the group consisting of a diol of the formula III

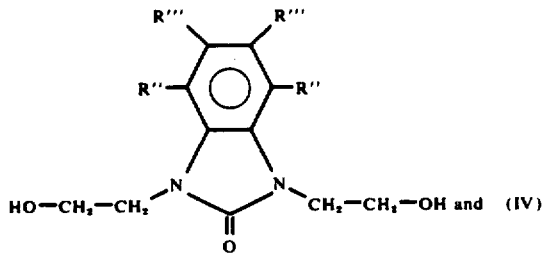

(III)

of the formula IV

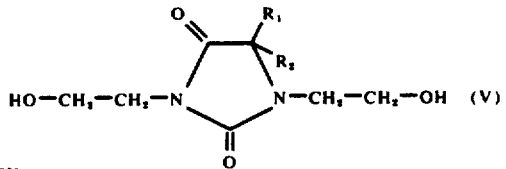

of the formula V

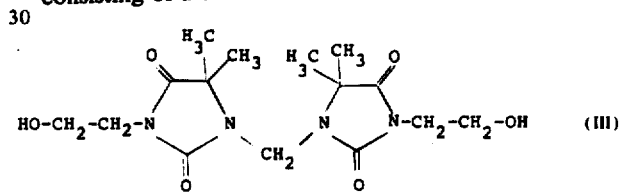

(V)

and $y$ mols of a diol of the formula VI

HO—D—OH (VI)

in a molar ratio corresponding to the mol fraction $(x/x + y) = 0.1$ to 1.0 and in the presence of catalysts, to a relative viscosity of 1.1 to 3.0, measured at 30° C. on a 1% strength solution consisting of equal parts of phenol and tetrachloroethane.

6. Process according to claim 5, characterised in that $x + y$ mols of s-triazinedicarboxylic acid diesters of the formula II wherein $R_1$ denotes a lower alkyl group having 1 to 4 C atoms or the phenyl group, R denotes the para-phenylene radical and R' represents ethyl or phenyl, and $x$ and $y$ denote integers, are polycondensed, in a molar ratio corresponding to the mol fraction $(x/x + y) = 0.4$ to 0.9, to a relative viscosity of 1.3 to 2.5, with $x$ mols of the diol of the formula III or of a diol of the formula IV or V and $y$ mols of an aliphatic diol of the formula VI wherein D denotes an aliphatic radical having 2 to 4 C atoms.

7. Process according to claim 5, characterised in that 2-diphenylamino- or 2-diethylamino-4,6-bis-(p-ethoxycarbonylanilino)-s-triazine is used as the s-triazinedicarboxylic acid derivative of the formula II.

8. Process according to claim 5, characterised in that 1,1'-methylene-bis-[3-(2-hydroxyethyl)-5,5-dimethylhydantoin] is used as the diol of the formula III and 1,3-di-(2-hydroxyethyl)-4,5,6,7-tetrachlorobenzimidazolone is used as the diol of the formula IV.

* * * * *